(12) United States Patent
Hughes et al.

(10) Patent No.: US 6,209,565 B1
(45) Date of Patent: Apr. 3, 2001

(54) PRESSURE LATCHED POPPET CARTRIDGE VALVE

(75) Inventors: Timothy Lloyd Hughes, Cypress; John Douglas Smith, Houston, both of TX (US)

(73) Assignee: DTC International, Inc., Houston, TX (US)

(*) Notice: Subject to any disclaimer, the term of this patent is extended or adjusted under 35 U.S.C. 154(b) by 0 days.

(21) Appl. No.: 09/421,836

(22) Filed: Oct. 20, 1999

Related U.S. Application Data

(60) Provisional application No. 60/105,240, filed on Oct. 22, 1998.

(51) Int. Cl.[7] .............................. F16K 31/124; G05D 7/06
(52) U.S. Cl. ................. 137/107; 137/627.5; 137/627.67; 137/627.68
(58) Field of Search ............................... 137/107, 625.66, 137/625.67, 627.5; 251/50

(56) References Cited

U.S. PATENT DOCUMENTS

| | | |
|---|---|---|
| 3,400,734 | 9/1968 | Rosenberg . |
| 3,520,511 | 7/1970 | Warne . |
| 4,004,610 * | 1/1977 | Theriot .............................. 137/625.88 |
| 4,877,046 * | 10/1989 | Albrigtsen et al. .................. 137/107 |
| 5,174,544 | 12/1992 | Emanie . |

* cited by examiner

*Primary Examiner*—Michael Buiz
*Assistant Examiner*—Ramesh Krishnamurthy
(74) *Attorney, Agent, or Firm*—Bracewell & Patterson, LLP; James E. Bradley

(57) ABSTRACT

A pulse piloted cartridge valve that defaults to a closed position. A spring biases against a latching piston assembly within the valve to position the latching piston assembly to the closed position. In this position, a supply port is sealed off from a control port. Pressurized fluid may be provided in a pilot open chamber to move the pilot open piston downward on the upper stem of the latching piston assembly to push the latching piston assembly to an open position. When in the open position, the passageway from the control port to the supply port is opened as well as the passageway from the control port to the axial passageway. Pressure is then transferred from the supply port through the axial passageway to the latching chamber. The pilot open piston is raised by pressure from the axial passageway. The latching piston assembly is held in the open position with pressure within the latching chamber. The pressure provided to the pilot open chamber may then be removed and the latching piston remains in the open position. The pulse piloted cartridge valve of the invention may be closed by providing pressurized fluid to a pilot closed chamber or by decreasing pressure from the supply port so that the latching piston assembly will be returned to a closed position by the spring.

7 Claims, 3 Drawing Sheets

PRESSURE LATCHED POPPET CARTRIDGE VALVE

CROSS-REFERENCE TO RELATED APPLICATIONS

This application claims the benefits of provisional application Ser. No. 60/105,240, filed on Oct. 22, 1998, in the U.S. Patent and Trademark Office.

TECHNICAL FIELD

This invention relates to a hydraulic piloted, manifold cartridge valve. More particularly, the cartridge valve of the invention is pulse operated and may be closed by applying a second pulse or by reducing the supply pressure to the valve.

BACKGROUND ART

Cartridge valves are used in the fluid power and hydraulic control systems industries as a mechanism to control the flow of a pressurized fluid to an end user device, such as hydraulic cylinders or subsea tree actuators. Cartridge valves typically require an external pilot source, such as piloting solenoid valves, to provide a hydraulic pressure to the internal actuating pistons located in the cartridge valve. When pilot pressure is applied to a cartridge valve piston surface, the piston travels through the cylinder, providing axial movement of a valve seal mechanism. The valve seal mechanism opens or closes multiple ports for fluid transfer from one hydraulic buss to another.

Current methods of control for hydraulic piloted, manifold cartridge valves include manually operated valves that supply the cartridge valve with pilot pressures or solenoid operated piloting valves. Solenoid operated piloting valves require electrical power to actuate the piloting valve mechanism. Solenoids requiring continual electrical supply to maintain pilot supply pressure to the cartridge poppet valve use large amounts of electrical energy and create excessive heat. By creating a pressure latched cartridge poppet valve, the solenoid operated pilot valves can be de-energized, thereby saving electrical demand and consumption, and considerably reducing excessive heat.

SUMMARY OF INVENTION

A pulse piloted cartridge valve is pulse operated and defaults to a closed position when supply pressure is lost. The pulse piloted cartridge valve has a housing defining a piston chamber, a supply port, a vent port and a control port. A latching piston assembly is slidably located in the piston chamber. A spring biases the latching piston assembly to a closed position wherein the supply port is sealed off from the control port. A pilot open piston is slidably received on an upper stem of the latching piston assembly within the piston chamber. The pilot open piston divides the piston chamber into a pilot open chamber above the pilot open piston. An axial or first passageway within the latching piston assembly is in communication with the vent port. A poppet cavity communicates with the control port, the vent port, the supply port and the axial passageway.

In operation, the pulse piloted cartridge valve defaults to a closed position due to the spring biasing against the latching piston assembly. In a closed position, the supply port is sealed off from a control port. Pressurized fluid is provided in the pilot open chamber to move the pilot open piston downward on the upper stem of the latching piston assembly to push the latching piston assembly to an open position. Fluid pressure is vented from the latching chamber, which is located below the pilot open piston, through the axial passageway within the latching piston assembly and out of the vent port to accommodate the downwardly moving pilot open piston. The control passageway from the control port to the supply port is opened and the control passageway from the control port to the axial passageway is opened when the latching piston assembly is moved downward. Pressure is then transferred from the supply port through the axial passageway to the latching chamber. The pilot open piston is raised by the pressure from the axial passageway. The latching piston assembly is held in the open position with the pressure within the latching chamber. At this time, the pressure provided to the pilot open chamber may be removed and the latching piston will remain in the open position.

The pulse piloted cartridge valve of the invention may be closed by one of two methods. First, pressurized fluid may be provided to a pilot closed chamber to force the latching piston assembly to a closed position with the aid of a bias spring. Second, pressure from the supply port may be decreased, pressure from the latching chamber may be vented through the axial passageway, and the latching piston assembly will be returned to a closed position by the spring.

DETAILED DESCRIPTION OF THE INVENTION

Figure 1:
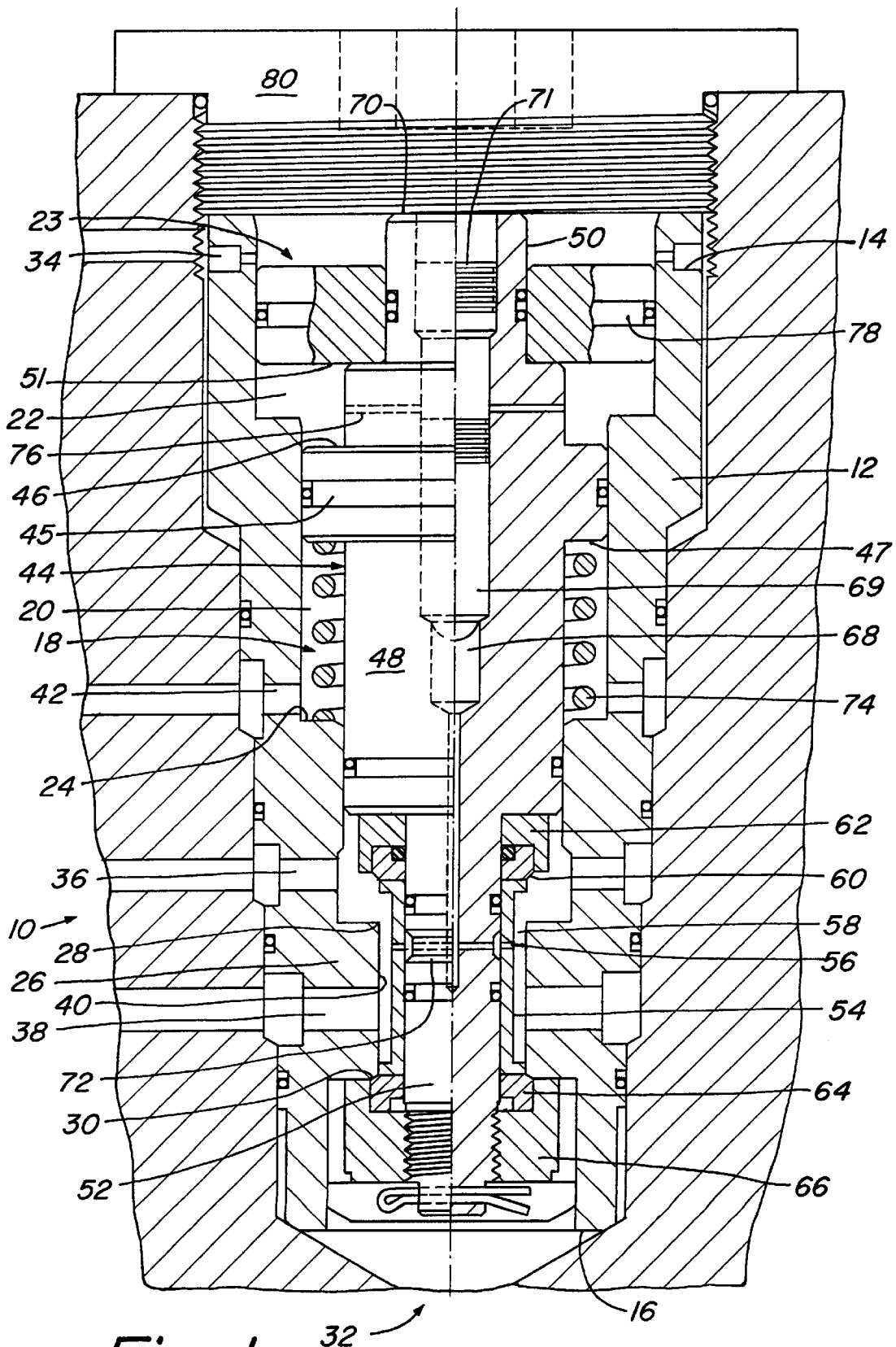
FIG. 1 is a partial cross-sectional view of the cartridge valve of the invention.

Referring now to FIG. 1, a pulse piloted cartridge valve is designated generally 10. The pulse piloted cartridge valve 10 includes a housing 12 having an upper end 14 and a lower end 16. Housing 12 defines a piston chamber 18 that includes a pilot closed chamber 20, a latching chamber 22, and a pilot open chamber 23. An interior ledge 24 is formed within piston chamber 18. Housing 12 also defines a neck 26 proximate lower end 16 of housing 12. Neck 26 has an upper corner seal seat 28 and a lower corner seal seat 30.

Housing 12 has a supply port 32 on lower end 16 of housing 12. A pilot open port 34 is formed on housing 12 near upper end 14 of the housing 12. A vent port 36 is formed above neck 26 and a control port 38 communicates It with an interior surface 40 of neck 26. A pilot close port 42 is formed in housing 12 between vent port 36 and pilot open port 34.

A latching piston assembly 44 is positioned within piston chamber 18. Latching piston assembly 44 has a head 45, a spool 48, and an upper stem 50, which extends toward upper end 14 of housing 12. Upper stem 50 has a shoulder 51 thereon. Additionally, latching piston assembly 44 has a lower stem 52 that extends toward lower end 16 of housing 12.

A poppet spacer 54 surrounds lower stem 52. Poppet spacer 54 has an aperture 56 formed therein. Poppet spacer 54 defines a poppet cavity 58 between poppet spacer 54 and the interior surface 40 of neck 26.

An upper seal 60 on an upper end of poppet spacer 54 is positioned to engage upper corner 28 of neck 26 to seal vent port 36 from control port 38 when latching piston assembly 44 is in a lower or open position. A gland 62 on an upper end of lower stem 52 supports upper seal 60. A lower seal 64 on a lower end of poppet spacer 54 engages lower corner 30 of neck 26 to seal control port 38 from supply port 32 when latching piston assembly 44 is in an closed position. A gland nut 66 on a lower end of lower stem 52 secures lower seal 64 on lower stem 52.

An axial or first passageway 68 extends from an upper end 70 of upper stem 50 through lower stem 52 to a point near aperture 56 in poppet spacer 54. Upper end 70 of axial passageway 68 is capped with plug 71, preferably a Lee plug. A miniature precision fluid restrictor 69 is located within axial passageway 68. The miniature precision fluid restrictor 69 is interference press fit into the axial passageway 68 to form a pressure tight seal around the external surface of the restrictor 69 to allow fluid only to travel through the orifice feature of restrictor 69. A radial passage 72 communicates poppet cavity 58 with axial passageway 68 through aperture 56 in poppet spacer 54.

A return spring 74 is positioned between head 45 of latching piston assembly 44 and interior ledge 24 of housing 12. Return spring 74 biases and latches piston assembly 44 in an upward or closed position.

A pilot open piston 78 is slidably affixed to upper stem 50. A horizontal pilot passageway 76 communicates axial passageway 68 with latching chamber 22. The horizontal pilot passageway 76 is positioned between upper surface 46 of head 45 of latching piston assembly and pilot open piston 78. The pilot open piston 78 is housed within the cartridge valve housing 12. The pilot open piston 78 is located on upper stem 50 by means of a sliding fit. The pilot open piston 78 is constrained by shoulder 51 on the latching piston assembly 44 on a first side and a threaded plug, preferably a SAE straight plug or end cap 80 on the other side.

A threaded end cap 80 is used to secure housing 12 in position. A clearance is maintained between end cap 80 and upper end 70 to prevent a pre-load from being applied to cartridge valve 10.

Figure 2:
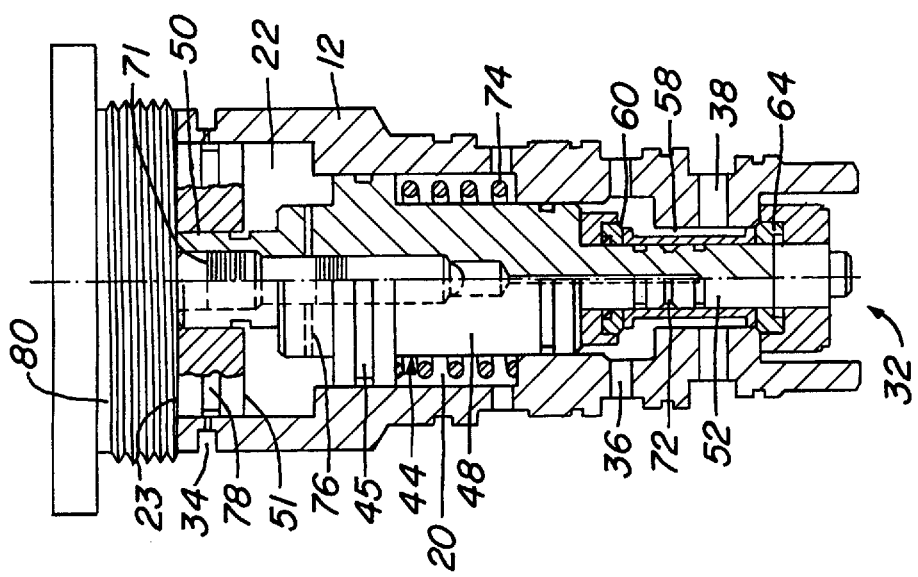
FIG. 2 is a schematic partial cross-sectional view of the cartridge valve of the invention shown in a closed position.

Referring now to FIGS. 2–5, in practice, cartridge valve 10, preferably a two position three way valve, is shown in its normally closed position (FIG. 2). Upon command from a control source (not shown), electrical power is sent to the pilot open solenoid piloting valve (not shown). Fluid pressure from a pilot bus (not shown) fills the pilot open port 34 and pilot open chamber 23 in cartridge valve 10. This fluid pressure begins to push against the pilot open piston 78.

As fluid pressure increases in the pilot open chamber 23, the mechanical advantage of the pressure acting on the pilot open piston 78 overcomes a spring force resistance created by return spring 74 and the force created by fluid pressure from supply port 32 acting on a lower end of latching piston assembly 44. Translation of the latching piston assembly 44 then begins, which moves the entire latching piston assembly 44 including head 45, spool 48, upper stem 50 and lower stem 52. At the beginning of this stage, fluid pressure on lower surface 47 of head 45 of latching piston assembly 44 is equalized with the pressure in vent port 36 by means of a valve (not shown) attached to port 42. The fluid pressure in latching chamber 22 is vented through horizontal pilot passageway 76, restrictor 69, axial passageway 68, radial passage 72, aperture 56 and out vent port 36.

Figure 3:
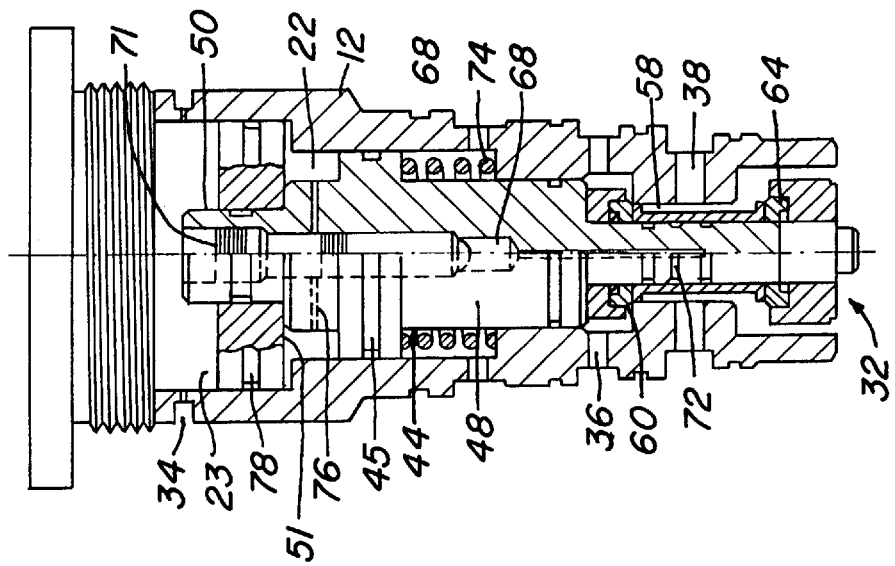
FIG. 3 is a schematic partial cross-sectional view of the cartridge valve of the invention shown in an open position with pilot open pressure applied.

As described above, the entire latching piston assembly 44 translates from its normally closed position shown in FIG. 2 to its new position shown in FIG. 3. The translation from one position to the other is described below.

In the closed position (FIG. 2), lower seal 64 prevents fluid from supply port 32 from entering into the cartridge valve poppet cavity 58. In this position, the pressure is equalized between the control port 38, the poppet cavity 58, and the vent port 36. Upon application of fluid pressure in the pilot open cavity 23, as described above, the latching piston assembly 44 shifts to its new position as shown in FIG. 3. In this position, the hydraulic supply port 32 fills the poppet cavity 58 with fluid pressure and the poppet cavity 58 is sealed from the vent port 36 by the upper seal 60. Fluid pressure is commuted from the hydraulic supply port 32 through the control port 38 to the end user device (not shown).

Figure 4:
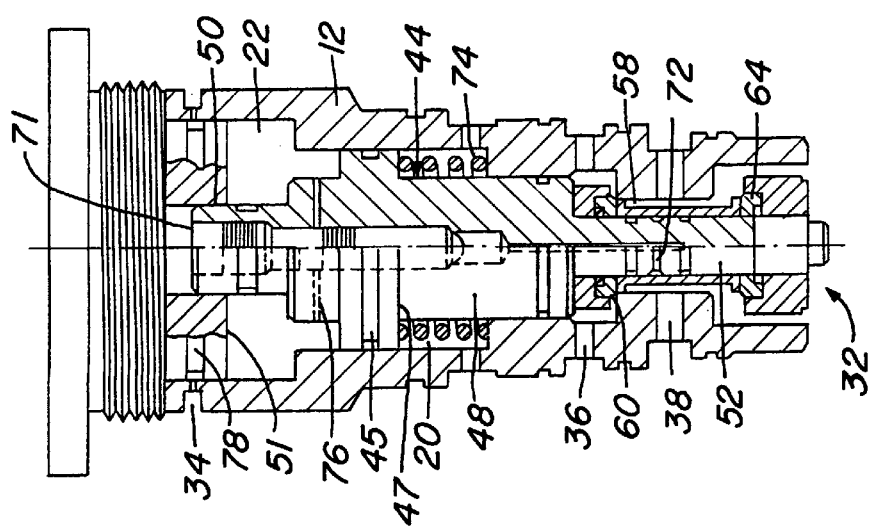
FIG. 4 is a schematic partial cross-sectional view of the cartridge valve of the invention shown in a latched opened position after venting of pilot open pressure.

Fluid pressure enters the lower stem 52 through the aperture 56 in poppet spacer 54 and acts against the miniature precision fluid restrictor 69. After a brief period of time the fluid will travel through the orifice feature of restrictor 69 and begin to fill and pressurize latching chamber 22. Restrictor 69 slows the transfer of fluid and also dampens pressure fluctuation. Fluid enters the latching chamber 22 from restrictor 69 through horizontal pilot passageway 76. This fluid supports the pilot open piston 78. Plug 71 prevents fluid pressure from entering pilot open chamber 23. As pressure increases in latching chamber 22, the pilot open piston 78 is shifted off of shoulder 51 and is translated to its position shown in FIG. 4. The mechanical advantage acting on shoulder 51 and on upper surface 46 of head 45 of latching piston assembly 44 overcomes the spring force resistance created by return spring 74 while simultaneously shifting pilot open piston 78 upwards. Fluid is forced out of pilot open chamber 23 back through to a pilot open pressure bus (not shown) and through the energized or de-energized pilot open solenoid piloting valve (not shown). In FIG. 4, the pulse piloted cartridge valve 10 is in a state of being pressure latched by the hydraulic supply carried through the latching piston assembly 44 into the latching chamber 22.

At this point the pilot open solenoid piloting valve (not shown) can be de-energized, thereby saving electrical power and demand. The latching piston assembly 44 will remain in its pressure latched (open) position shown in FIG. 4 until either the pilot closed solenoid piloting valve (not shown) is energized or in the event of the hydraulic supply pressure from supply port 32 dropping sufficiently to lower the pressure in the latching chamber 22 below the required hold open pressure.

The following steps refer to the two closing methods. When the pilot closed solenoid piloting valve (not shown) is energized, fluid pressure travels into the pilot closed chamber 20 and the pilot closed pressure with assistance from the spring force 74 acts on the pilot closed piston surface area or lower surface 47 of head 45, which forces the entire latching piston assembly 44 to the closed position shown in FIG. 5. In this process, fluid is ejected from the latching chamber 22 back through the axial passageway 68 and restrictor 69 into poppet cavity 58. This allows for the latching piston assembly 44 to shift to its closed position. Pressurized fluid from the control port 38 and latching chamber 22 will travel out through the vent port 36. Sufficient time must be allowed for the pressure to vent from the latching chamber 22 prior to de-energizing the pilot closed solenoid piloting valve (not shown). At this point, the hydraulic supply from supply port 32 is isolated from the control port 38 and latching chamber 22 and the cartridge valve 10 will remain closed.

Figure 5:
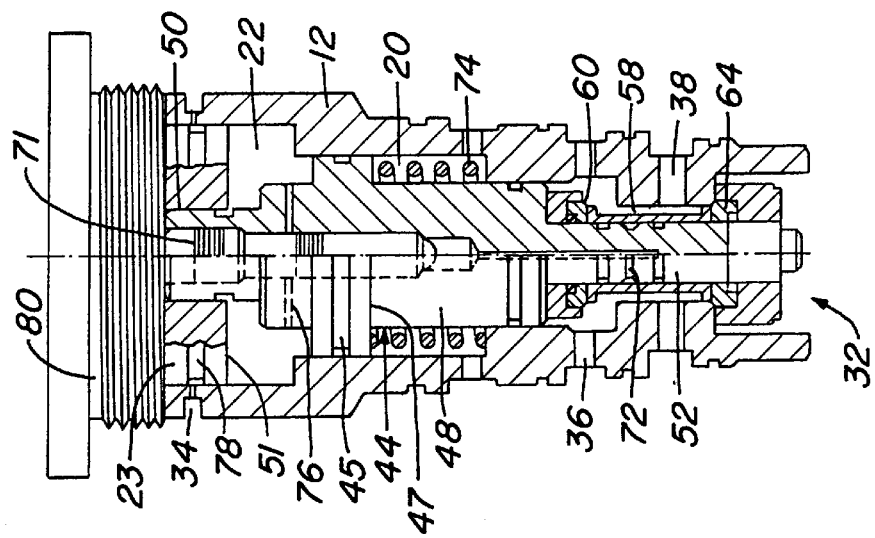
FIG. 5 is a schematic partial cross-sectional view of the cartridge valve of the invention shown in a closed position after loss of supply pressure.

The other method of closing the cartridge valve from its open position shown in FIG. 4, to its closed position shown in FIG. 5, is to decrease or remove the main hydraulic supply acting through supply port 32 to the valve. Upon removal or significantly decreasing the hydraulic supply pressure, the fluid travels out of the latching chamber 22 due to the differential pressure through the restriction orifice 69, back into the poppet cavity 58 where it is eventually through vent port 36. This action of ejecting fluid from the latching chamber 22 is assisted by return spring 74, which forces the latching piston assembly 44 into its closed position.

The invention has several advantages. These advantages include the ability to open or close a poppet cartridge and maintain a poppet cartridge valve in its open or closed position with only a pulse of pilot pressure, rather than maintaining a pilot open control valve in an open position by operating the poppet cartridge valve with maintained pressure. Therefore, energy used to hold solenoids open is reduced, which decreases the energy requirements and prolongs the life of electrical components.

Another advantage is the ability to de-activate or close the poppet valve by reducing the supply pressure in port 32.

Although the invention is shown in only one of its forms, it should be apparent to those skilled in the art that it is not so limited, but is susceptible to various changes without departing from the scope of the invention.

We claim:

1. A pulse piloted cartridge valve comprising:

a housing defining a piston chamber, a supply port, a vent port and a control port;

a latching piston assembly having an upper stem and a head, said latching piston assembly slidably located in said piston chamber and movable between an open position and a closed position;

a biasing mechanism to bias said latching piston assembly to the closed position, sealing said supply port from said control port;

a pilot open piston slidably received on said upper stem of said latching piston assembly within said piston chamber, said pilot open piston defining a pilot open chamber above said pilot open piston, such that a pulse applied to said pilot open chamber moves the latching piston assembly downward to the open position;

a first passageway within said latching piston assembly leading from the supply port to the piston chamber between the head of the latching piston assembly and the pilot open piston for applying pressure from the supply port when said latching piston assembly is in said open position to hold the latching piston assembly in said open position without continued application of pulse pressure to said pilot open chamber; and a poppet cavity communicating said control port, said vent port, said supply port and said first passageway, said poppet cavity blocking the supply port from the vent port while the latching piston assembly is in the open position;

wherein if supply pressure from said supply port fails, said biasing mechanism forces said latching piston assembly back to the closed position.

2. The pulse piloted cartridge valve according to claim 1 further comprising:

a fluid restrictor in said first passageway to dampen minor pressure fluctuations from said supply pressure when said latching piston assembly is in the open position.

3. A pulse piloted cartridge valve comprising:

a housing defining a piston chamber, a supply port, a vent port and a control port;

a latching piston assembly having an upper stem and a head, said latching piston assembly slidably located in said piston chamber and movable between an open position and a closed position;

a biasing mechanism to bias said latching piston assembly to the closed position, sealing said supply port from said control port;

a pilot open piston slidably received on said upper stem of said latching piston assembly within said piston chamber, said pilot open piston defining a pilot open chamber above said pilot open piston, such that a pulse applied to said pilot open chamber moves the latching piston assembly downward to the open position;

a first passageway within said latching piston assembly leading from the supply port to the piston chamber between the head of the latching piston assembly and the pilot open piston for applying supply pressure from the supply port when said latching piston assembly is in the open position to hold the latching piston assembly in the open position without continued application of pulse pressure into said pilot open chamber;

a fluid restrictor in said first passageway to dampen minor pressure fluctuations from said supply pressure when said latching piston assembly is in the open position;

a poppet cavity communicating said control port, said vent port, said supply port and said first passageway, said poppet cavity blocking the supply port from the vent port while the latching piston assembly is in the open position;

wherein if said supply pressure from said supply port fails, said biasing mechanism forces said latching piston assembly back to the closed position.

4. A method of operating a pulse piloted cartridge valve comprising the steps of:

(a) biasing a latching piston assembly to a closed position wherein a supply port is sealed off from a control port;

(b) providing pressurized fluid in a pilot open chamber to move a pilot open piston downward on a stem of said latching piston assembly to push said latching piston assembly to an open position;

(c) venting fluid pressure from a latching chamber located below said pilot open piston through an first passageway within said latching piston assembly and out a vent port to accommodate the downwardly moving pilot open piston;

(d) opening a control passageway from said control port to said supply port and from said control port to said first passageway;

(e) transferring pressure from said supply port through said first passageway to said latching chamber;

(f) raising said pilot open piston with said pressure from said first passageway;

(g) holding said latching piston assembly in said open position with said pressure within said latching chamber; and (h) ceasing said step of providing pressurized fluid into said pilot open chamber.

5. The method of operating a pulse piloted cartridge valve according to claim 4 wherein said step of venting in step (c)

includes restricting fluid flow through said first passageway with a fluid restrictor.

6. The method of operating a pulse piloted cartridge valve according to claim 4 further comprising the steps of:
providing fluid to a pilot closed chamber to force the latching piston assembly to a closed position.

7. The method of operating a pulse piloted cartridge valve according to claim 4 further comprising the steps of:

decreasing pressure from said supply port;

venting fluid pressure from said latching chamber through said first passageway; and returning said latching piston assembly to said closed position with said biasing member.

\* \* \* \* \*